(12) United States Patent
Kinoshita et al.

(10) Patent No.: US 10,173,404 B2
(45) Date of Patent: Jan. 8, 2019

(54) SYNTHETIC RESIN SKIN MATERIAL AND METHOD OF MANUFACTURING SYNTHETIC RESIN SKIN MATERIAL

(71) Applicants: KYOWA LEATHER CLOTH CO., LTD., Hamamatsu-shi, Shizuoka (JP); TOSOH CORPORATION, Yamaguchi (JP)

(72) Inventors: Takafumi Kinoshita, Hamamatsu (JP); Takahito Nakamura, Hamamatsu (JP); Tadayuki Kawaguchi, Yokohama (JP)

(73) Assignees: Kyowa Leather Cloth Co., Ltd., Hamamatsu-shi, Shizuoka (JP); Tosoh Corporation, Yamaguchi (JP)

( * ) Notice: Subject to any disclaimer, the term of this patent is extended or adjusted under 35 U.S.C. 154(b) by 40 days.

(21) Appl. No.: 15/319,314

(22) PCT Filed: Jul. 6, 2015

(86) PCT No.: PCT/JP2015/069460
§ 371 (c)(1),
(2) Date: Dec. 15, 2016

(87) PCT Pub. No.: WO2016/006583
PCT Pub. Date: Jan. 14, 2016

(65) Prior Publication Data
US 2017/0136749 A1 May 18, 2017

(30) Foreign Application Priority Data
Jul. 7, 2014 (JP) .................... 2014-140023

(51) Int. Cl.
C09D 175/06 (2006.01)
C09D 151/08 (2006.01)
(Continued)

(52) U.S. Cl.
CPC ............... B32B 27/40 (2013.01); B32B 7/12 (2013.01); B32B 27/00 (2013.01)

(58) Field of Classification Search
CPC ....... C08L 75/04; C08L 63/10; C09D 163/10; C09D 151/08; C09D 175/04;
(Continued)

(56) References Cited

U.S. PATENT DOCUMENTS 3,640,829 A * 2/1972 Elton ...................... B32B 38/06
428/315.7
3,900,688 A 8/1975 Thoma et al.
(Continued)

FOREIGN PATENT DOCUMENTS

JP S49-93503 9/1974
JP 09-031859 2/1997
(Continued)

OTHER PUBLICATIONS

International Search Report in PCT/JP2015/069460, dated Sep. 29, 2015.

*Primary Examiner* — Thao T Tran
(74) *Attorney, Agent, or Firm* — Kilpatrick Townsend & Stockton LLP

(57) ABSTRACT

A synthetic resin skin material includes, on one side of a base material 12, an adhesive layer 14, a skin layer 16, and a surface processing layer 18 in this order from the base material 12, the adhesive layer 14 and the skin layer 16 containing a polyurethane urea resin having a number average molecular weight of from 35,000 to 100,000.

8 Claims, 1 Drawing Sheet

(51) Int. Cl.
*C09D 5/00* (2006.01)
*B32B 27/40* (2006.01)
*B32B 27/00* (2006.01)
*B32B 7/12* (2006.01)

(58) Field of Classification Search
CPC ...... C09D 175/06; C09D 175/16; C09D 5/00; C09D 5/002; C09D 5/02; C08G 18/12; C08G 18/282; C08G 18/0823; C08G 18/3215; C08G 18/4202; C08G 18/4211; C08G 18/4238; C08G 18/6659; C08G 18/7621; Y10T 428/31551
USPC ........................................ 428/423.1; 522/109
See application file for complete search history.

(56) References Cited

U.S. PATENT DOCUMENTS

2008/0004395 A1* 1/2008 Covelli .............. C08G 18/0823
 524/591
2009/0247658 A1 10/2009 Kobayashi et al.

FOREIGN PATENT DOCUMENTS

| JP | 2002-339262 | 11/2002 |
| JP | 2008-274205 | 11/2008 |

* cited by examiner

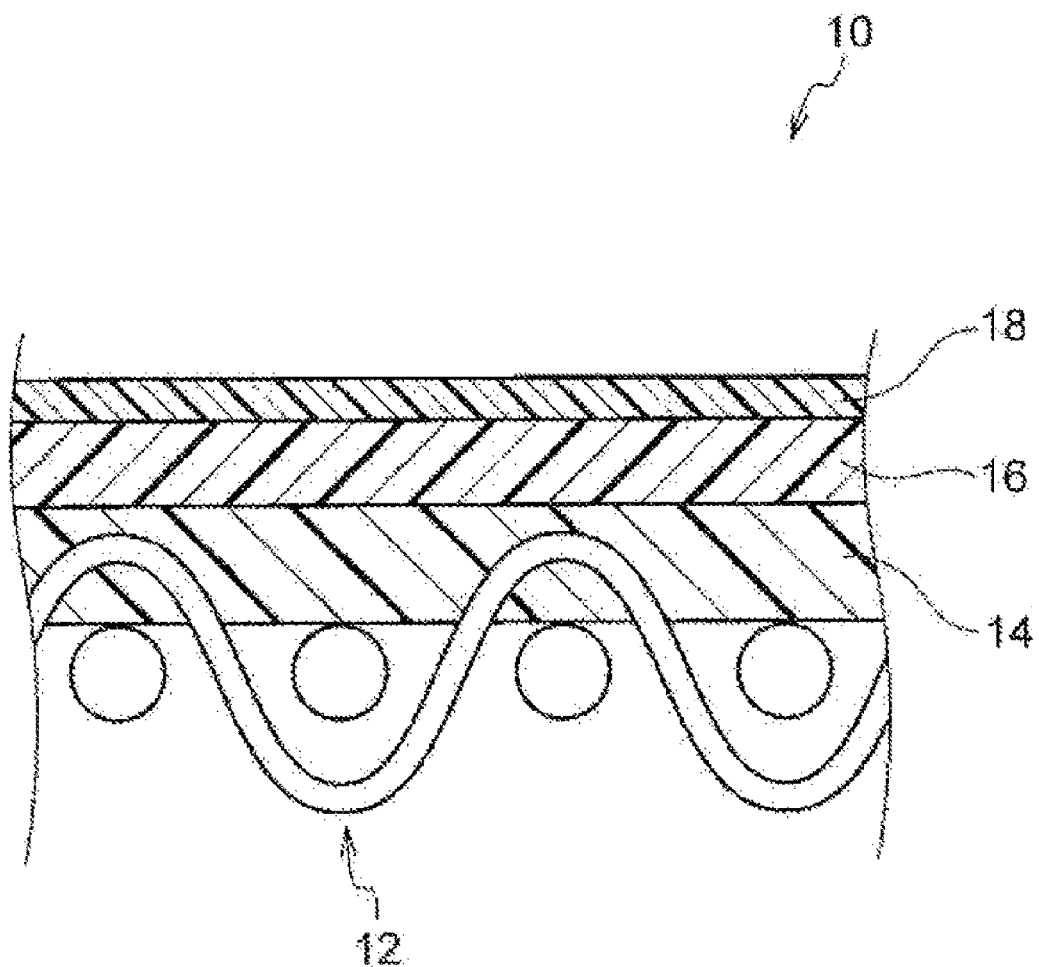

SYNTHETIC RESIN SKIN MATERIAL AND METHOD OF MANUFACTURING SYNTHETIC RESIN SKIN MATERIAL

CROSS-REFERENCES TO RELATED APPLICATIONS

This application is a U.S. National Phase Application of PCT/JP2015/069460, international filing date Jul. 6, 2015, which claims priority to Japanese Application No. 2014-140023, filed Jul. 7, 2014.

TECHNICAL FIELD

The present invention relates to a synthetic resin skin material having tolerance against a sunscreen agent, and a manufacturing method of the synthetic resin skin material.

BACKGROUND ART

Recently, instead of natural leathers and fabric sheets, synthetic resin skin materials having excellent durability have been often applied to automobile interior and exterior parts such as instrument panels, door trims, seats, and ceiling, interior parts of train vehicles and aircrafts such as trims, seats, and ceiling, furniture, shoes, footwear, bags, construction interior and exterior materials, outer covering materials and backing materials for clothes, wall covering materials, and the like. Some of such synthetic resin skin materials have, on their outermost surface, unevenness similar to unevenness that natural leathers have, that is, embossed patterns.

For example, for automobile interior parts, synthetic leathers having leather-like outer appearance are used for seats, in replacement of natural leathers.

Manufacturing methods of a synthetic leather as a synthetic leather excellent in outer appearance, textures, and mechanical strength have been proposed, the method including forming a skin layer on a surface of a base material by a wet method, peeling off the base material, applying an adhesive on the skin layer, and adhering the skin layer to a base cloth material (see, for example, Japanese Patent Application Laid-Open (JP-A) No. H09-31859).

Recently, an adverse effect of ultraviolet on human body has been considered as a problem. In order to reduce the adverse effect of ultraviolet, sunscreen agents having an increased content of an ultraviolet absorbing agent have become more popular, so that sunscreen agents are regularly used regardless of seasons and sexes, in addition to the use for women's cosmetics in summer time.

A sunscreen agent contains, in a cream, an emulsion, a lotion, or the like, a component selected from a compound having an ultraviolet absorbing ability, or particles having an ultraviolet blocking ability. Hereinafter, a compound having an ultraviolet absorbing ability may be referred to as an ultraviolet absorbing agent in this Description.

As a sunscreen agent, those containing an ultraviolet absorbing agent which is easy to be formulated are generally used.

Synthetic resin skin materials for seats in automobile vehicles are required to have high durability. Conventionally, chemical resistance has been put on importance for synthetic resin skin materials, and therefore, synthetic resin skin materials sufficiently resistant against oil components such as engine oil and aqueous components such as sweats have been selected. Thus, the synthetic resin skin materials are resistant against hair dressings or the like containing an aqueous solvent and an oil component.

SUMMARY OF INVENTION

Technical Problem

However, the inventors' studies found that there are cases in which a synthetic resin skin material swells, thereby deteriorating the outer appearance, when the synthetic resin skin material is in contact with a sunscreen agent having a high content of an ultraviolet absorbing agent which is generally used these years.

A urethane resin used in a synthetic resin skin material in order to improve texture has urethane bonds in their molecules, and a urethane resin having a ring structure such as a benzene ring in its molecule is used as a urethane resin for the purpose of improving various properties.

On the other hand, an ultraviolet absorbing agent is generally a compound having an aromatic ring structure such as a benzene ring and having a bulky molecular structure. When an ultraviolet absorbing agent comes into contact with a synthetic resin skin material, it is speculated that there are cases in which undesirable infiltration of an ultraviolet absorbing agent from a surface of a synthetic resin skin material to an inner part of the synthetic resin skin material occurs, which causes swelling of the surface of the synthetic resin skin material, since a ring structure such as an aromatic ring in the ultraviolet absorbing agent is highly affinitive with a urethane resin used in the synthetic resin skin material, more specifically, with a urethane bond, which is a partial structure in the urethane resin. Moreover, it is considered that there are cases in which a polar group such as hydroxyl group in an ultraviolet absorbing agent contacting a surface of a urethane resin affects and loosens urethane bonds of the urethane resin, thereby causing swelling due to the loosened urethane bonding.

Such effects of a sunscreen agent on a urethane resin have not been taken into consideration so far, and currently there is no product standard for synthetic resin skin materials in Japan relating to a sunscreen agent containing an ultraviolet absorbing agent.

An object of the invention is to provide a synthetic resin skin material having excellent tolerance against sunscreen agents such that outer appearance deterioration due to swelling of a surface of the synthetic resin skin material is inhibited even if a sunscreen agent containing an ultraviolet absorbing agent comes into contact with the synthetic resin skin material, and a manufacturing method of a synthetic resin skin material.

Solution to Problem

As a result of diligent studies, the inventors found that the above problems may be solved by controlling the molecular structure and the molecular weight of a polyurethane resin used in a skin layer and an adhesive layer in a synthetic resin skin material, and accomplishing the invention.

The invention encompasses the following aspects.

<1> A synthetic resin skin material including, on one side of a base material, an adhesive layer, a skin layer, and a surface processing layer in this order from the base material, the adhesive layer and the skin layer including a polyurethane urea resin having a number average molecular weight of from 35,000 to 100,000.

<2> The synthetic resin skin material according to <1>, wherein the polyurethane urea resin is obtained by reacting a polyol, a polyisocyanate, a diamine, and a monoamine.
<3> The synthetic resin skin material according to <2>, wherein the polyol includes a polycarbonate polyol.
<4> The synthetic resin skin material according to <3>, wherein the polycarbonate polyol has a number average molecular weight of from 500 to 50,000, and a number of active hydrogen groups in one molecule of the polycarbonate polyol is from 1.9 to 4.0.
<5> The synthetic resin skin material according to <3> or <4>, wherein the polycarbonate polyol has a partial structure represented by the following general formula (1).

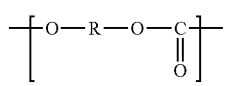

General Formula (1)

In general formula (1), R is a divalent aliphatic $C_2$-$C_{20}$ hydrocarbon group, or a divalent alicyclic $C_6$-$C_{20}$ hydrocarbon group, and when a molecule includes more than one R, the respective R's may be identical with each other or different from each other.
<6> The synthetic resin skin material according to any one of <2> to <5>, wherein the polyisocyanate includes an alicyclic diisocyanate.
<7> The synthetic resin skin material according to any one of <2> to <6>, wherein the diamine includes an alicyclic diamine.
<8> The synthetic resin skin material according to any one of <1> to <7>, wherein the polyurethane urea resin in the skin layer has a number average molecular weight of from 60,000 to 100,000, and the polyurethane urea resin in the adhesive layer has a number average molecular weight of from 35,000 to 100,000.
<9> The synthetic resin skin material according to any one of <1> to <8>, being for use as a skin material of a shaped product.
<10> A method of manufacturing a synthetic resin skin material, including: forming a skin layer by a drying method by applying a resin solution containing a polyurethane urea resin onto a peeling material, the polyurethane urea resin being obtained by reacting a polyol, a polyisocyanate, a diamine, and a monoamine and having a number average molecular weight of from 60,000 to 100,000, and thermally drying the resin solution; forming an adhesive layer by applying an adhesive agent on a side of the skin layer not in contact with the peeling material, the adhesive agent containing a polyurethane urea resin being obtained by reacting a polyol, a polyisocyanate, a diamine, and a monoamine and having a number average molecular weight of from 35,000 to 100,000; performing pressure bonding to bond a base material onto a surface of the adhesive layer thus formed; and forming a surface processing layer by peeling off the peeling material from the skin layer, applying a polyurethane resin solution or a polyurethane resin dispersion liquid onto a side of the skin layer which is exposed after the peeling of the peeling material, and drying the polyurethane resin solution.
<11> The method of manufacturing a synthetic resin skin material according to <10>, wherein the peeling material has unevenness that forms embossed patterns on the skin layer.

In this Description, an amount of the component of a composition refers to, when more than one substances corresponding to the component exist in a composition, a total amount of the more than one substances existing in the composition, unless otherwise specified.

In this Description, the term "step" may be used not only for an independent step but also for a step which is not clearly distinguishable from another step, as long as an intended purpose of the step can be achieved.

Advantageous Effects of Invention

According to the invention, a synthetic resin skin material having tolerance against sunscreen agents such that outer appearance deterioration due to swelling of a surface of the synthetic resin skin material is inhibited even if a sunscreen agent containing an ultraviolet absorbing agent comes into contact with the synthetic resin skin material, and a manufacturing method of a synthetic resin skin material, are provided.

BRIEF DESCRIPTION OF DRAWINGS

FIG. 1 is a schematic cross-sectional diagram illustrating a layer structure of a synthetic resin skin material according to one embodiment of the invention.

DESCRIPTION OF EMBODIMENTS

Preferable embodiments of the invention will be described below.

Note that, hereinafter, an effect of inhibiting outer appearance deterioration caused by swelling due to contacting of a sunscreen agent may be referred to as "sunscreen agent tolerance".

<Synthetic Resin Skin Material>

First, a synthetic resin skin material of the invention will be described, referring to FIG. 1. FIG. 1 is a schematic cross-sectional diagram illustrating a layer structure of a synthetic resin skin material 10 according to one embodiment of the invention.

The synthetic resin skin material 10 according to the embodiment includes a base material 12, and starting from the side of the base material 12, an adhesive layer 14, a skin layer 16, and a surface processing layer 18 in this order. The adhesive layer 14 and the skin layer 16 contain a polyurethane urea resin having a number average molecular weight of from 35,000 to 100,000. It is preferable that the polyurethane urea resin has a specific partial structure described below.

As illustrated in FIG. 1, the synthetic resin skin material 10 in this embodiment includes a surface processing layer 18 on the skin layer 16. The surface processing layer 18 is a layer provided for improving the outer appearance, strength, or the like of the skin layer 16.

An outermost surface of the synthetic resin skin material 10, including the skin layer 16 and the surface processing layer 18 provided on the skin layer 16 and the like, may have embossed patterns, for example, embossed patterns similar to those of a natural leather, in order to improve a decorative property.

In this embodiment, what is meant by the expression "includes . . . in this order" is that the adhesive layer 14, the skin layer 16, and the surface processing layer 18 are provided, on one side of the base material 12, in this order starting from the base material 12. This expression does not exclude cases in which another layer such as a primer layer, a colored resin layer, a cushion layer or the like is additionally provided, if desired.

According to the studies conducted by the inventors, it is considered that occurrences of swelling due to a sunscreen agent containing an ultraviolet absorbing agent is caused by a presence of a partial structure in a urethane resin that has affinity with the ultraviolet absorbing agent.

Therefore, it is deduced that infiltration of an ultraviolet absorbing agent into a skin layer and swelling due to the infiltration can be reduced by using a resin excellent in sunscreen agent tolerance for a skin layer, which is most susceptible to external influences, and for an adhesive layer provided adjacent to the skin layer. It should be noted that the invention is not limited by this deduced mechanism.

A polyurethane resin is generally obtained from reacting a polyol (typically a diol) and a diisocyanate. The inventors found that a synthetic resin skin material is significantly improved in sunscreen agent tolerance by including a polyurethane urea resin having a number average molecular weight of from 35,000 to 100,000 in a skin layer and an adhesive layer, in replacement of a urethane resin obtained only by a polyol and a diisocyanate. Moreover, the inventors found that a polyurethane urea resin is preferably a polyurethane urea resin obtained by reacting a diamine and a monoamine, in addition to a polyol and a diisocyanate.

(Polyurethane Urea Resin)

Hereinbelow, in this embodiment, a polyurethane urea resin in a skin layer and an adhesive layer will be explained in detail. However, the invention is not limited to the following description, as long as the invention is within the gist of the present invention.

A polyurethane urea resin used in this embodiment is a polyurethane urea resin having a number average molecular weight from 35,000 to 100,000. It is preferable that the polyurethane urea resin is obtained by reacting a polyol (A), a polyisocyanate (B), a diamine (C), and a monoamine (D).

For the sake of explanation, components that are preferable raw materials of the polyurethane urea resin are labeled with (A), (B), (C), and (D), respectively in the following explanation. In the following, a polyol (A), a polyisocyanate (B), a diamine (C), and a monoamine (D) may be referred to as "(A) component", "(B) component", "(C) component", and "(D) component", respectively.

A method of preparing the polyurethane urea resin by using the (A) component to (D) component is not particularly limited. A general urethane urea resin preparation method, such as a method described in JP-A No. H08-165320 may be applied.

<Polyol (A)>

A polyol (A), which is a raw material of the polyurethane urea resin, preferably has a molecular weight from 500 to 50,000, more preferably from 1,000 to 4,000.

A number average molecular weight of a polyol can be measured by using gel permeation chromatography (GPC).

In this embodiment, a number average molecular weight of a polyol was measured by running a solvent (N,N-dimethyl formamide) at a flow rate of 1.0 ml (1.0 cm$^3$) per minute at a temperature of 40° C., and injecting 3 mg sample weight of tetrahydrofuran sample solution of a concentration of 0.2 g/20 ml (20 cm$^3$). In the molecular weight measurement, measurement condition is selected such that the molecular weight of the sample is included within the range in which the logarithms of the molecular weights and the count numbers are in a linear correlation on a standard curve obtained using several monodispersed polystyrene standard samples. Note that the solvent and the measurement temperature condition may be changed as appropriate.

A polyol (A) used in the invention preferably has 1.9 to 4.0 active hydrogen groups in one molecule thereof, that is, the average functional group number of hydroxyl groups, which are active hydrogen groups in a polyol, is preferably from 1.9 to 4.0.

In particular, as a polyol (A) used in manufacturing a polyurethane urea resin in this embodiment, a polycarbonate polyol is preferable in terms of reduced yellow coloring and high durability of an obtained polyurethane urea resin.

(Polycarbonate Polyol)

Specific examples of the polycarbonate polyol used as a polyol (A) in this embodiment include a polyol having a partial structure represented by the following general formula (1).

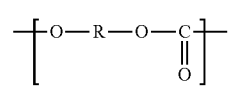

General Formula (1)

In general formula (1), R is a divalent aliphatic $C_2$-$C_{20}$ hydrocarbon group, or a divalent alicyclic $C_6$-$C_{20}$ hydrocarbon group, and when a molecule includes more than one R, the respective R's may be identical with each other or different from each other.

Among these, a compound represented by general formula (1), wherein R is a divalent aliphatic $C_2$-$C_{16}$ hydrocarbon group, or a divalent alicyclic $C_6$-$C_{16}$ hydrocarbon group is preferable.

Examples of the partial structure represented by general formula (1) include a partial structure obtained from a dealcoholizing reaction or a dephenolizing reaction between one or more kinds selected from low molecular weight polyols and one or more kinds selected from carbonate compounds.

Specific examples of the low molecular weight polyol used in the reaction for obtaining the partial structure represented by general formula (1) include ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 3,3-dimethylol heptane, diethylene glycol, dipropylene glycol, neopentyl glycol, diethylene glycol, dipropylene glycol, cyclohexane-1,4-diol, cyclohexane-1,4-dimethanol, dimer acid diol, ethylene oxide adducts or propylene oxide adducts of bisphenol A, bis(β-hydroxyethyl)benzene, xylylene glycol, glycerin, trimetylol propane, pentaerythritol, and the like.

For the reaction for obtaining the partial structure represented by general formula (1), either one kind or two or more kinds of low molecular polyols in combination may be used.

Specific examples of the carbonate compound for use in the reaction for obtaining the partial structure represented by general formula (1) include: dialkyl carbonate compounds such as dimethyl carbonate and diethyl carbonate; alkylene carbonate compounds such as ethylene carbonate and propylene carbonate; diaryl carbonates such as diphenyl carbonate, dinaphthyl carbonate, dianthryl carbonate, diphenanthryl carbonate, diindanyl carbonate, tetrahydronaphthyl carbonate; and the like.

For the reaction for obtaining the partial structure represented by general formula (1), either one kind or two or more kinds of carbonate compounds in combination may be used.

(Copolymer Polyol)

Other preferable examples of a polyol (A) usable as a raw material of the polyurethane urea resin include a copolymer polyol obtained by an ester exchange reaction of a polycarbonate polyol, a polycaprolactone polyol, and an aliphatic glycol, because a polyurethane urea resin thus formed can form a resin film excellent in durability, weather resistance, flexibility, and the like.

A ratio of the polycarbonate polyol and the aliphatic glycol with respect to the polycaprolactone polyol [(polycarbonate polyol+aliphatic glycol)/polycaprolactone polyol] is preferably in a range of from 99/1 to 60/40.

Examples of the polycaprolactone polyol used for obtaining a copolymer polyol include a copolymer polyol obtained by addition of one or more kinds of low molecular polyol to one or more kinds of compounds selected from the group consisting of ε-caprolactone and an alkyl-substituted ε-caprolactone, upon ring opening, using the one or more kinds of low molecular polyols as a starting material.

Specific examples of the low molecular polyol usable as a starting material of the polycaprolactone polyol include a low molecular polyol selected from ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 3,3-dimethylol heptane, diethylene glycol, dipropylene glycol, neopentyl glycol, diethylene glycol, dipropylene glycol, cyclohexane-1,4-diol, cyclohexane-1,4-dimethanol, dimer acid diol, ethylene oxide adducts or propylene oxide adducts of bisphenol A, bis(β-hydroxyethyl)benzene, xylylene glycol, glycerin, trimetylol propane, pentaerythritol, and the like.

(Preparation Method of Copolymer Polyol)

As a preparation method of the copolymer polyol, a known technique may be used. In general, the copolymer polyol can be manufactured by mixing and dissolving a polycarbonate polyol, a polycaprolactone polyol, and an aliphatic glycol mentioned above under a temperature of from 50° C. to 80° C. while bubbling nitrogen gas therein, until the polycarbonate polyol, the polycaprolactone polyol, and the aliphatic glycol are evenly dissolved, and then carrying out an ester exchange reaction under temperature atmosphere of from 180° C. to 200° C. until a target molecular weight is reached.

In preparing a polyurethane urea resin, either one kind or two or more kinds of a polyol (A) in combination may be used.

Moreover, as a raw material of the polyurethane urea resin, another polyol different from the polycarbonate polyol and the copolymer polyol mentioned above may be additionally used, as long as the use of another polyol does not adversely affect the effect of the invention.

<Polyisocyanate (B)>

As a polyisocyanate (B) used for preparing the polyurethane urea resin, an alicyclic diisocyanate is preferable.

(Alicyclic Diisocyanate)

Examples of the alicyclic diisocyanate usable for preparing the polyurethane urea resin include a diisocyanates having an aliphatic ring. Specific examples of the diisocyanates having an aliphatic ring include isophorone diisocyanate, cyclohexane diisocyanate, methylene bis(cyclohexylisocyanate), methyl cyclohexane-2,4 (or 2,6)-diisocyanate, diphenylmethane diisocyanate, hydrogenated diphenyl methane diisocyanate, norbornane diisocyanate, hydrogenated toluilendiisocyanate, hydrogenated xylene diisocyanate, hydrogenated tetramethyl xylene diisocyanate, and the like.

In preparing the polyurethane urea resin, either one kind or two or more kinds of a polyisocyanate (B) in combination may be used.

In preparing the polyurethane urea resin, a polyisocyanate different from the alicyclic diisocyanates mentioned above may be additionally used, as long as the use of the polyisocyanate different from the alicyclic diisocyanates does not adversely affect the effect of the invention.

<Diamine (C)>

As the diamine used for preparing the polyurethane urea resin, an alicyclic diamine is preferable.

(Alicyclic Diamine)

Specific examples of the alicyclic diamine used for preparing the polyurethane urea resin include isophorone diamine, cyclohexane diamine, norbornane diamine, hydrogenated tolylene diamine, hydrogenated xylene diamine, hydrogenated tetra methyl xylene diamine, and the like.

Among these, isophorone diamine is preferable as the alicyclic diamine, since the use of isophorone diamine can impart an excellent sunscreen agent tolerance to a polyurethane urea resin thus obtained.

(Other Diamine)

A diamine other than the alicyclic diamine mentioned above may be additionally used for preparing the polyurethane urea resin, as long as the use of such diamine does not adversely affect the effect of the invention. Examples of the diamine other than the alicyclic diamine include ethylene diamine, butylene diamine, hexamethylene diamine, diphenyl methane diamine, tolylene diamine, xylylene diamine, 2-hydroxy ethyl ethylene diamine, 2-hydroxy ethyl propylene diamine, di-2-hydroxy ethyl ethylene diamine, di-2-hydroxy ethyl propylene diamine, 2-hydroxy propyl ethylene diamine, di-2-hydroxy propyl ethylene diamine, 2-hydroxy-1,3-propane diamine, and the like. Examples of the diamine other than the alicyclic diamine include a compound which can serve as a chain extender.

In preparing the urethane urea resin, either one kind or two or more kinds of a diamine (C) may be used in combination.

<Monoamine (D)>

A monoamine (D) used for preparing the polyurethane urea resin is employed for adjusting viscosity of the resultant polyurethane urea resin and down-regulating gelatification of the resultant polyurethane urea resin.

Specific examples of the monoamine (D) include ethyl amine, morpholine, propyl amine, dibutyl amine, diethyl amine, monoethanol amine, dibutyl amine monoethanol amine, diethanol amine, N-methyl ethanol amine, N-ethyl ethanol amine, N-n-butyl ethanol amine, N-t-butyl ethanol amine, hydroxyethyl piperazine, N-(3-amino propyl) diethanol amine, N-cyclohexyl ethanol amine, and the like.

In preparing the polyurethane urea resin, either one kind or two or more kinds of the monoamine (D) may be used in combination.

A polyurethane urea resin having excellent sunscreen agent tolerance, which is suitably used in the invention, can be prepared by employing a general synthetic method of polyurethane resins using an (A) component to a (D) component. For example, the polyurethane urea resin may be synthetized by synthesizing an isocyanate group-terminated prepolymer via a urethanation reaction between a polyol (A) and a polyisocyanate (B), and carrying out a urea-forming reaction of the isocyanate group-terminated prepolymer thus obtained, a diamine (C), and a monoamine (D).

For a blending ratio of the raw materials, it is preferable that a content of the (A) component is from 40% by mass to 90% by mass, a content of the (B) component is from 5% by mass to 50% by mass, a content of the (C) component is from 1% by mass to 30% by mass, and a content of the (D) component is from 0.1% by mass to 10% by mass, where the total content of the (A) component+the (B) component+the (C) component+the (D) component equals 100% by mass.

More preferably, the (A) component is from 50% by mass to 85% by mass, the (B) component is from 10% by mass to 40% by mass, the (C) component is from 2% by mass to 20% by mass, and the (D) component is from 0.1% by mass to 5% by mass, where the sum of the (A) component+the (B) component+the (C) component+the (D) component equals 100% by mass.

For a blending molar ratio of the (A) component, the (B) component, the (C) component, and the (D) component, it is preferable that a blending amount of the (B) component (mol) is equal to [a blending amount of the (A) component (mol)+a blending amount of the (C) component (mol)+a blending amount of the (D) component (mol)]. More preferably, when 1 mole of the (B) component is used, an amount of the (A) component is from 0.3 mole to 0.7 mole, an amount of the (C) component is from 0.298 to 0.6, and an amount of the (D) component is from 0.002 mole to 0.1 mole.

An obtained polyurethane urea resin preferably has a number average molecular weight of from 35,000 to 100,000.

When a number average molecular weight is within the above range, excellent sunscreen agent tolerance can be obtained, and durability and flexibility expected for a synthetic resin skin material can be achieved.

The synthetic resin skin material of the invention achieves advantageous effects by employing the polyurethane urea resin described above for a skin layer and an adhesive layer.

Hereinafter, the synthetic resin skin material of the invention will be described in series in accordance with the configuration.

(1. Base Material)

A base material 12 used for a synthetic resin skin material 10 in the invention is not particularly limited, as long as the base material 12 is a base material having strength, durability, and flexibility expected for a synthetic resin skin material. A base material can be selected as appropriate from synthetic resin sheets, foundation clothes and the like, according to intended purposes of the synthetic resin skin material. Among these, it is preferable that a base cloth is used as the base material 12, in view of adhesion with the adhesive layer adjacent to the base material, and of flexibility.

The base cloth may be any cloth having strength and flexibility expected for a base material of a synthetic resin skin material. The base cloth may be any of a fabric, a knit, and the non-woven cloth.

In view of bending rigidity, it is preferable that the base cloth is a knit. The knit may be warp-knitted or weft-knitted. In view of flexibility, the knit for use as a base cloth is preferably a circular-knitted cloth, which is one aspect of a weft knitted knit, such as jersey. Examples of the circular knitting include plain stitch, fraise stitch, circular interlock knitting, mockrody, brushed interlock, punch, pique, and the like. An irregular knitting called mockrody and the like is preferable.

Examples of the synthetic resin sheet usable as a base material other than the base cloth include synthetic resin sheets prepared by forming, into a sheet form, a thermoplastic resin or a thermoplastic elastomer such as a styrene-based elastomer, an olefin-based elastomer, and a polyester-based elastomer.

For tension strength of the base material, it is preferable that breaking strength measured by the labelled strip test method (JIS L 1063, 2010) is 30 N/5 cm or greater, in view of durability.

The base material 12 is preferably from 0.3 mm to 2.0 mm in thickness, more preferably from 0.6 mm to 1.2 mm in thickness. When a thickness of a base material is within the above range, the base cloth can have strength and flexibility suitable for practical uses.

A base cloth used as the base material of the synthetic resin skin material is also commercially available. Preferable examples of the commercially available base cloth include SSY034 and T4100 (product name) made by SAWAMURA Co., Ltd., and the like.

(2. Skin Layer)

The skin layer 14 of the synthetic resin skin material 10 according to this embodiment is formed from the polyurethane urea resin according to this embodiment described above.

More specifically, on a peeling material such as a release paper, a skin layer-forming composition containing at least one kind of a resin selected from the group consisting of the polyurethane urea resins described above is applied and dried to form the skin layer.

The skin layer may either be single-layered, or have a layered structure having an upper skin layer having embossed patterns formed thereon, and a lower skin layer formed from a flexible foamed resin containing forms such as foamed polyurethane. When the skin layer has a layered structure, at least the upper skin layer contains a polyurethane urea resin according to the invention.

A method for forming a skin layer according to this embodiment at least includes applying a composition for forming a skin layer onto a peeling material, typically a release paper, and drying the composition.

For the formation of the skin layer, the composition for forming a skin layer is prepared by first dissolving a polyurethane urea resin for forming a skin layer in a solvent to prepare a solution, and adding a coloring agent and/or other additives, if necessary. The composition for forming a skin layer preferably has a solid content concentration of approximately from 10% by mass to 50% by mass in view of uniform coatability and drying characteristics.

Applying a composition for forming a skin layer onto a surface of a peeling base material may be carried out by a known method. Examples of an application method include application methods using a known coating method, such as knife coating, closed head coating, roll coating, reverse roll coating, gravure coating, and the like.

An application amount of the composition for forming a skin layer is selected in accordance with purposes. In general, the application amount is an amount that achieves an application amount of from 50 $g/m^2$ to 300 $g/m^2$ as a skin layer after being dried.

After applying the composition for forming a skin layer on a release base material, the composition is thermally dried at a temperature of from 70° C. to 140° C. for a period of from 1 minute to 3 minutes to form a skin layer.

As another specific example of the method of forming a skin layer, for example, a method described in JP-A No. 2010-168692, etc. may be referred to.

When a skin layer has a layered structure, the skin layer may be formed by sequentially applying a composition for forming a skin layer onto a peeling base material in order to form each layer. Alternatively, a skin layer may be formed by forming an upper skin layer on a peeling base material in advance, stacking thereon a lower skin layer prepared separately, bonding the upper skin layer and the lower skin layer by thermocompression or using an adhesive agent, thereby forming a layered body having a lower skin layer and a upper skin layer.

The peeling material may be a release material having unevenness that forms embossed patterns on the skin layer.

By using, as a peeling material, a release material having unevenness that forms desired embossed patterns on the surface in advance, for example, a release material having natural leather-like unevenness formed in advance, natural leather-like embossed patterns can be formed on the surface of the skin layer.

(3. Adhesive Layer)

The base material 12 and the skin layer 16 are bonded together via the adhesive layer 14. By using a polyurethane urea resin having high sunscreen agent tolerance in forming the adhesive layer 14, the obtained synthetic resin skin material 10 can attain an excellent sunscreen agent tolerance.

An adhesive agent used to form the adhesive layer contains a polyurethane urea resin. Both the skin layer and the adhesive layer contain a polyurethane urea resin according to this embodiment. Since the skin layer and the adhesive layer are different from each other in layer thickness and function, the polyurethane urea resin in the skin layer and the polyurethane urea resin in the adhesive layer may either be the same resin or be different from each other.

An adhesive base component in the adhesive layer is not particularly limited, as long as the polyurethane urea resin described above is contained. An adhesive agent in the adhesive layer is preferably a two-component curing polyurethane adhesive agent containing a polyurethane urea resin as an adhesive base component, in view of workability. The two-component curing polyurethane adhesive agent may be any adhesive agent selected from a two-component curing polyether-based polyurethane adhesive agent, a two-component curing polyester-based polyurethane adhesive agent, and a two-component curing polycarbonate-based polyurethane adhesive agent.

The adhesive layer can be formed from a composition for forming an adhesive layer, the composition containing an adhesive agent. The adhesive layer is preferably in a range of from 20 μm to 100 μm in thickness after being dried.

As long as the composition for forming an adhesive layer contains a polyurethane urea resin, the composition may contain various additives in accordance with purposes, provided that the additives do not adversely affect effects of the invention.

One example of the additives that a composition for forming an adhesive layer can contain is a fire-retardant such as a phosphorous fire-retardant. If a fire-retardant content is excessive with respect to the composition for forming an adhesive layer, an adhesive layer thus obtained may have a high shearing stress. Therefore, if a fire-retardant is contained, the fire-retardant content is preferably 5% by mass or less with respect to the composition for forming an adhesive layer.

(Surface Processing Layer)

The synthetic resin skin material 10 includes a surface processing layer 18 on a surface opposite to the side on which the adhesive layer 14 of the skin layer 16 is provided. With the configuration in which the synthetic resin skin material 10 includes a surface processing layer 18, improvements in durability, texture, etc. can be expected.

The surface processing layer 18 may either be single-layered or in a form of layered body having two or more layers.

Examples of a method of forming a surface processing layer 18 include a method including applying, onto a surface of the skin layer 16, a polyurethane surface processing agent containing a polyurethane resin solution or dispersion, using a direct gravure printing machine or a reverse gravure printing machine.

Examples of the polyurethane resin usable for forming the polyurethane surface processing agent include a polycarbonate-based polyurethane, a polyether-based polyurethane, a polyester-based polyurethane, and their derivatives. Among these, the polyurethane resin usable for the polyurethane surface processing agent is preferably a polycarbonate-based polyurethane, when the synthetic resin skin material is for automobile interior parts and thus needs long-term durability.

The surface processing layer 18 containing a polyurethane resin is preferably in a range of from 2 μm to 30 μm in thickness after being dried.

When the surface processing layer 18 is provided for the purpose of improving durability, hardness of the polyurethane coating used is preferably from 294 N/cm$^2$ to 1470 N/cm$^2$, at 100% modulus measured according to JIS K 6251 (2010).

The polyurethane surface processing agent used for forming the surface processing layer 18 may further contain a cross-linking agent, a lubricant, a coloring agent, or the like in addition to the polyurethane resin solution or dispersion.

The polyurethane resin in the surface processing agent used for forming the surface processing layer may be in the form of a polyurethane resin solution in which the polyurethane resin is dissolved in an organic solvent, or in the form of a polyurethane resin dispersion in which particles of a polyurethane resin are dispersed in an aqueous solvent.

The surface processing layer 18 may be provided for the purpose of improving texture. Examples of a resin raw material used for forming a surface processing layer for the purpose of improving the texture include a polycarbonate-based polyurethane, a polyether-based polyurethane, a polyester-based polyurethane, their derivatives, and the like.

When the surface processing layer 18 is provided for the purpose of improving texture, hardness of the polyurethane coating used is preferably from about 98 N/cm$^2$ to about 1470 N/cm$^2$, more preferably from about 490 N/cm$^2$ to about 980 N/cm$^2$ at 100% modulus measured according to JIS K 6251 (2010).

The surface processing layer 18 for improving texture may contain an organic filler in order to attain a soft and moist texture. Specific examples of the organic filler include urethane beads having a number average particle diameter of from 1 μm to 40 μm. Other examples of an organic filler include silicone beads, acryl beads, and the like.

The surface processing layer 18 may either contain only one kind of organic filler or two or more kinds of organic fillers. If the surface processing layer 18 contains an organic filler, the surface processing layer 18 preferably has an organic filler content of from 0.1% by mass to 2.0% by mass with respect to a total solid content of the surface processing layer 18.

(Manufacturing Method of Synthetic Resin Skin Material)

A manufacturing method of a synthetic resin skin material of this embodiment includes: forming a skin layer 16 by a drying method by applying a resin solution containing a polyurethane urea resin onto a peeling base material, the polyurethane urea resin being obtained by reacting a polyol, a polyisocyanate, a diamine, and a monoamine and having a number average molecular weight of from 60,000 to 100,000, and thermally drying the resin solution; forming an adhesive layer 14 by applying an adhesive agent on a side of the skin layer 16 not in contact with the peeling base material, the adhesive agent containing a polyurethane urea resin being obtained by reacting a polyol, a polyisocyanate, a diamine, and a monoamine and having a number average molecular weight of from 35,000 to 100,000; performing pressure bonding to bond a base material 12 onto a surface of the adhesive layer 14 thus formed; and forming a surface processing layer 18 by peeling off the peeling base material from the skin layer 16, applying a polyurethane resin solution onto a side of the skin layer 16 which is exposed after the peeling of the peeling base material, and drying the polyurethane resin solution.

The adhesive agent used for forming the adhesive layer 14 is an adhesive agent containing a polyurethane urea resin as a base component of the adhesive agent used in the synthetic resin skin material of this embodiment described above.

According to the method described in the explanation on the skin layer 16, a composition for forming an adhesive layer is applied onto the skin layer 16 formed via a drying method, on a side opposite to the side on which the peeling base material is provided, and the composition is dried at 120° C., whereby a layer of a composition for forming an adhesive layer is formed. A base material 12 is bonded to the layer of a composition for forming an adhesive layer, and matured at 50° C. for 48 hours. The peeling base material is peeled off, and then a surface processing agent 18 is formed on a side of the skin layer 16 from which the peeling base material was peeled off, whereby a synthetic resin skin material 10 having an adhesive layer 14, a skin layer 16, and a surface processing layer 18 on a base material 12 in this order from the side of the base material 12 is obtained.

Before forming the adhesive layer 14 on the skin layer 16, a resin layer (primer layer) may be additionally formed on the skin layer 16 in order to improve bonding property.

The adhesive layer 14 may be formed by a transfer method, as well as the applying method described above as a method of forming the adhesive layer 14. If the adhesive layer 14 is formed by a transfer method, the adhesive layer 14 may be provided with a protective sheet on the surface of the adhesive layer 14 formed in advance. As the protective sheet, a resin film, a paper processed to be releasable, resin-laminated paper, or the like can be used as appropriate.

Due to its excellent sunscreen agent tolerance, in the synthetic resin skin material 10 of this embodiment, swelling and outer appearance deterioration caused by an ultraviolet absorbing agent is reduced, and excellent outer appearance is maintained for a long time, even if a sunscreen cream or the like containing an ultraviolet absorbing agent comes into contact with the surface of the synthetic resin skin material 10. Therefore, the synthetic resin skin material 10 is suitably applicable to various usages. Thus, the synthetic resin skin material 10 is preferably applicable as a synthetic resin skin material tolerant against sunscreen agent.

Applicable fields of the synthetic resin skin material of this embodiment include, for example, automobile interior parts, interior parts of trains, aircrafts, etc., saddles of two-wheel vehicles, interior parts of ships, furniture, shoes, footwear, bags, outer skin materials of clothes, and the like. Among these, effects the synthetic resin skin material are significant when the synthetic resin skin material of this embodiment is used for interior and exterior parts of automobiles such as instrument panels, door trims, seats, and the like, with which a sunscreen agent on a face or body easily get in contact.

EXAMPLES

Here, the invention will be described, referring to Examples. It should be noted that the invention is not limited to these Examples.

Example 1

Firstly, in 100 kg of a polyurethane resin [MNT-111 (product name) made by Nippon Polyurethane Industry Co., Ltd; number average molecular weight: 80,000, viscosity (25° C.): 13,000 mPa·s, solid content: 30% by mass], 20 kg of a pigment (made by DIC Corporation; DILAC BLACK L-1770S: product name) was added, and 50 kg of N,N-dimethyl formamide (DMF) was added as a solvent, and then stirred to obtain a composition for forming a skin layer.

On a release paper (made by Dai Nippon Printing Co., Ltd., DE-41: Product Name) on which embossed patterns were formed, the composition for forming the skin layer was applied using a knife coater method in such a way that the composition for forming the skin layer would be 30 μm in thickness after being dried. Then, the composition for forming the skin layer was dried at 120° C. for 2 min to obtain a skin layer 16.

As a base material 12, tricot fabric (knit woven with yarn of 75 deniers) was used.

To 100 kg of polyurethane urea resin [ADNT-311 (product name) made by Japan Urethane Industries, number average molecular weight: 90,000, viscosity (25° C.): 18,000 mPa·s, solid content: 30% by mass] as an adhesive agent base component, 1 kg of an isocyanurate-based curing agent [C-HX (product name) made by Nippon Polyurethane Industry Co., Ltd, NCO content: 21.2% by mass, viscosity (25° C.): 3,000 mPa·s, solid content: 100% by mass], which is a cross-linking agent, was added and stirred, whereby a composition for forming an adhesive layer was prepared.

On a side of the thus-obtained skin layer 16 not in contact with the release paper, the composition for forming the adhesive layer prepared above was applied in such a way that the composition for forming the adhesive layer would be 30 μm in thickness after being dried, thereby forming an adhesive layer 14. The adhesive layer 14 was bonded with a base material 12 and dried, thereby obtaining a layered body having the adhesive layer 14 and the skin layer 16 on the base material 12.

After that, the release paper was peeled therefrom. On the exposed surface of the skin layer 16, a one-component non-yellowing polycarbonate resin (conventional product (1): STAHL JAPAN LIMITED, WF-13-139 (product name)) as a surface processing agent for forming a surface processing layer 18 was applied in such a way that the surface processing agent would be 10 μm in thickness after being dried, and dried to form a surface processing layer 18, thereby obtaining a synthetic resin skin material 10 of Example 1.

Example 2

A synthetic resin skin material 10 of Example 2 was prepared in the same manner as in Example 1, except that MNT-111 (product name) for forming a skin layer used in Example 1 was replaced with a polyurethane urea resin [MNT-211 (product name) made by Nippon Polyurethane Industry Co., Ltd, number average molecular weight: 85,000, viscosity (25° C.): 10,000 mPa·s, solid content: 30% by mass].

Example 3

A synthetic resin skin material 10 of Example 3 was prepared in the same manner as in Example 1, except that MNT-111 (product name) for forming a skin layer used in Example 1 was replaced with MDI/PCD based polyurethane urea resin [MNT-311 (product name) made by Nippon Polyurethane Industry Co., Ltd, number average molecular weight: 90,000, viscosity (25° C.): 18,000 mPa·s, solid content: 30% by mass].

Comparative Example 1

A synthetic resin skin material of Comparative Example 1 was prepared in the same manner as in Example 1, except that MNT-111 (product name) for forming a skin layer used in Example 1 was replaced with a yellowing-resistant polycarbonate resin (conventional product (2) made by DIC Corporation, Crisvon MP-120 (product name)), and that the composition for forming an adhesive layer was replaced with a composition for forming an adhesive layer prepared by adding 7 kg of an isocyanurate-based curing agent (conventional product (4) made by DIC Corporation, DN-950 (product name)) as a curing agent to 100 kg of a two-component yellowing-resistant polycarbonate resin (conventional product (3) made by DIC Corporation, Crisvon TA-205 (product name)).

Comparative Example 2

A synthetic resin skin material of Comparative Example 2 was prepared in the same manner as in Example 1, except that MNT-111 (product name) for forming a skin layer used in Example 1 was replaced with a yellowing-resistant polycarbonate resin (conventional product (2) made by DIC Corporation, Crisvon MP-120 (product name)).

Comparative Example 3

A synthetic resin skin material of Comparative Example 3 was prepared in the same manner as in Example 1, except that the composition for forming an adhesive layer used in Example 1 was replaced with a composition for forming an adhesive layer used in Comparative Example 1, which included a two-component yellowing-resistant polycarbonate resin (conventional product (3) made by DIC Corporation, Crisvon TA-205 (product name)) and an isocyanurate-based curing agent (conventional product (4) made by DIC Corporation, DN-950 (product name)) as a curing agent.

Comparative Example 4

A synthetic resin skin material of Comparative Example 4 was prepared in the same manner as in Example 2, except that the composition for forming an adhesive layer used in Example 2 was replaced with a composition for forming an adhesive layer used in Comparative Example 1, which included a two-component yellowing-resistant polycarbonate resin (conventional product (3) made by DIC Corporation, Crisvon TA-205 (product name)) and an isocyanurate-based curing agent (conventional product (4) made by DIC Corporation, DN-950 (product name)) as a curing agent.

Details of each component used in Examples and Comparative Examples are shown below.

[Component for Forming a Surface Processing Layer]

(1) Conventional Product (1): One-Component Non-Yellowing Polycarbonate Resin (Made by Stahl Japan Limited, WF-13-139 (Product Name))

[Component for Forming a Skin Layer]

(2) MNT-111 (product name): a polyurethane urea resin (made by Japan Polyurethane Industry, number average molecular weight: 85,000, viscosity (25° C.): 10,000 mPa·s, solid content: 30% by mass) synthetized from IPDI (isophoronediisocyanate; (B) component)/PCD (1,6-hexanediol-based polycarbonate polyol; number average molecular weight 2,000; (A) component) as base components, and IPDA (isophoronediamine) as a (C) component and MEA (monoethanol amine) as a (D) component (3) MNT-211 (product name): a polyurethane urea resin (made by Japan Polyurethane Industry, number average molecular weight: 85,000, viscosity (25° C.): 10,000 mPa·s, solid content: 30% by mass) synthesized from IPDI (isophorone diisocyanate; (B) component)/a copolymer polyol (Number average molecular weight 2,000; (A) component) of PCD (1,6-hexanediol-based polycarbonate polyol (number average molecular weight 2,000))/polycaprolactone polyol (number average molecular weight 2,000)), as base components, IPDA as a (C) component, and MED as a (D) component (4) MNT-311 (product name): a polyurethane urea resin (made by Japan Polyurethane Industry, number average molecular weight: 90,000, viscosity (25° C.): 18,000 mPa·s at 25° C., solid content: 30% by mass) synthesized from MDI (diphenyl methane diisocyanate; (B) component)/a copolymer polyol (number average molecular weight 2,000; (A) component) of PCD (1,6 hexanediol-based polycarbonate polyol (number average molecular weight 2,000)/polycaprolactone polyol (number average molecular weight 2,000), as base components, IPDA as a (C) component, and MEA as a (D) component (5) Conventional product (2): a yellowing-resistant polycarbonate resin (made by DIC Corporation, Crisvon MP-120 (product name)) is a resin not within the scope of the invention, in which diamine and monoamine components are not involved in synthesizing a polyurethane resin.

[Component for Forming an Adhesive Layer]

(6) ADNT-311 (product name): PCD based polyurethane urea resin (made by Japan Polyurethane Industry, number average molecular weight: 35,000, viscosity (25° C.): 4,000 mPa·s, solid content: 43% by mass) synthesized from IPDI ((B) component)/a copolymer polyol (number average molecular weight 2,000; (A) component) of PCD (1,6-hexanediol-based polycarbonate polyol (number average molecular weight 2,000)/polycaprolactone polyol (number average molecular weight 2,000), as base components, IPDA as a (C) component, and MEA as a (D) component (7) C-HX (product name): an isocyanurate-based curing agent, made by Japan Polyurethane Industry Co., Ltd, NCO content: 21.2% by mass, viscosity (25° C.): 3,000 mPa·s, solid content: 100% by mass)

(8) Conventional Product (3): a two-component yellowing-resistant polycarbonate resin (made by DIC Corporation, Crisvon TA-205: product name) is a resin not within the scope of the invention, in which diamine and a monoamine components are not involved in preparing a polyurethane.

(9) Conventional Product (4): an isocyanurate-based curing agent (made by DIC Corporation, DN-950: product name)

(Performance Evaluation: Sunscreen Agent Tolerance Test)

As a test sample, a synthetic resin skin material cut out in a size of 200 mm×200 mm was used.

On a surface of the synthetic resin skin material 10 of Examples 1 to 3 and Comparative Examples 1 to 4, 1.0 g of 50% aqueous solution of Neutrogena Ultra Sheer DRY-TOUCH SUNBLOCK (product name: Neutrogena corporation, SPF45, containing oxybenzone as an ultraviolet absorbing agent), which is a sunscreen cream, was applied in a region of 10 cm×10 cm, and heated at 80° C. for 3 hours.

After that, the sunscreen cream was removed, and the region on which the sunscreen cream had been applied was visually observed and evaluated according to the following criteria.

In the criteria below, "A" is an excellent level, and "B" is a practically applicable level. Results are shown in Tables 1 and 2 below.

(Evaluation Criteria)
A: No or little swelling in resin
B: Coating was swelled and the shape of the surface was partially changed.
C: Coating was significantly swelled and the shape of the surface was changed.

TABLE 1

|  | Example 1 | Example 2 | Example 3 |
|---|---|---|---|
| Surface processing layer | WF-13-139 | WF-13-139 | WF-13-139 |
| Skin layer | MNT-111 | MNT-211 | MNT-311 |
| Adhesive layer base component | ADNT-311 | ADNT-311 | ADNT-311 |
| Adhesive layer curing agent | C-HX | C-HX | C-HX |
| Base material | Tricot fabric | Tricot fabric | Tricot fabric |
| Evaluation result Sunscreen cream tolerance | A | A | B |

TABLE 2

|  | Comparative Example 1 | Comparative Example 2 | Comparative Example 3 | Comparative Example 4 |
|---|---|---|---|---|
| Surface processing layer | WF-13-139 | WF-13-139 | WF-13-139 | WF-13-139 |
| Skin layer | MP120 | MP120 | MNT-111 | MNT-211 |
| Adhesive layer base component | TA-205 | ADNT-311 | TA-205 | TA-205 |
| Adhesive layer curing agent | DN-950 | C-HX | DN-950 | DN-950 |
| Base material | Tricot fabric | Tricot fabric | Tricot fabric | Tricot fabric |
| Evaluation result Sunscreen cream tolerance | C | C | C | C |

These results indicate that, in the synthetic resin skin materials of Examples 1 to 3, swelling and changes in outer appearance caused by the sunscreen agent containing an ultraviolet absorbing agent are reduced, and that the synthetic resin skin materials of Examples 1 to 3 have excellent sunscreen agent tolerance.

On the other hand, in all of the synthetic resin skin materials of Comparative Examples 1 to 4, changes in outer appearance caused by the sunscreen cream, which are a practical problem, were observed. Moreover, as is clear from Comparative Examples 2 to 4, effects of the invention cannot be attained when a polyurethane urea resin being obtained by reacting a polyol, a polyisocyanate, a diamine, and a monoamine and having a number average molecular weight of from 35,000 to 100,000 is not contained in both of the skin layer and the adhesive layer.

The entire disclosure of the Japanese Patent Application No. 2014-140023 filed on Jul. 7, 2014 is incorporated herein by reference.

Contents of all the literatures, patent applications, and technical standards mentioned herein are incorporated herein to the same extent as in the case in which it is specifically and individually mentioned that the individual literatures, patent applications, and technical standards are incorporated herein by reference.

The invention claimed is:

1. A synthetic resin skin material comprising, on one side of a base material, an adhesive layer, a skin layer, and a surface processing layer in this order from the base material, the adhesive layer comprising a polyurethane urea resin having a number average molecular weight of from 35,000 to 100,000, and the skin layer comprising a polyurethane urea resin having a number average molecular weight of from 85,000 to 90,000,
wherein the polyurethane urea resin in the skin layer is obtained by reacting the following: (a) at least one selected from the group consisting of (1) a polycarbonate polyol and (2) a copolymer polyol of a polycarbonate polyol and a polycaprolactone polyol; (b) alicyclic diisocyanate; (c) alicyclic diamine; and (d) monoamine; and
wherein the polyurethane urea resin in the adhesive layer is obtained by reacting the following: (i) a copolymer polyol of a polycarbonate polyol and a polycaprolactone polyol; (ii) alicyclic diisocyanate; (iii) alicyclic diamine; and (iv) monoamine.

2. The synthetic resin skin material according to claim 1, wherein the polyurethane urea resin in the adhesive layer has a number average molecular weight of 35,000.

3. The synthetic resin skin material according to claim 1, wherein the polycarbonate polyol has a partial structure represented by the following general formula (1):

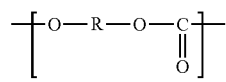

General Formula (1)

wherein, in general formula (1), R is a divalent aliphatic $C_2$-$C_{20}$ hydrocarbon group, or a divalent alicyclic $C_6$-$C_{20}$ hydrocarbon group, and when a molecule includes more than one R, the respective R's may be identical with each other or different from each other.

4. The synthetic resin skin material according to claim 1, wherein the skin layer has embossed patterns.

5. The synthetic resin skin material according to claim 1, wherein the polyurethane urea resin in the skin layer has a number average molecular weight of 85,000, and the polyurethane urea resin in the adhesive layer has a number average molecular weight of 35,000.

6. The synthetic resin skin material according to claim 1, being for use as a skin material of a shaped product.

7. A method of manufacturing a synthetic resin skin material, comprising:

forming a skin layer by a drying method by applying a resin solution containing a polyurethane urea resin onto a peeling material, the polyurethane urea resin being obtained by reacting the following: (a) at least one selected from the group consisting of (1) a polycarbonate polyol and (2) a copolymer polyol of a polycarbonate polyol and a polycaprolactone polyol; (b) alicyclic diisocyanate; (c) alicyclic diamine; and (d) monoamine, and having a number average molecular weight of from 85,000 to 90,000, and thermally drying the resin solution;

forming an adhesive layer by applying an adhesive agent on a side of the skin layer not in contact with the peeling material, the adhesive agent containing a polyurethane urea resin being obtained by reacting the following: (i) a copolymer polyol of a polycarbonate polyol and a polycaprolactone polyol; (ii) alicyclic diisocyanate; (iii) alicyclic diamine; and (iv) monoamine, and having a number average molecular weight of from 35,000 to 100,000;

performing pressure bonding to bond a base material onto a surface of the adhesive layer thus formed; and forming a surface processing layer by peeling off the peeling material from the skin layer, applying a polyurethane resin solution onto a side of the skin layer which is exposed after the peeling of the peeling material, and drying the polyurethane resin solution.

8. The method of manufacturing a synthetic resin skin material according to claim 7, wherein the peeling material has unevenness that forms embossed patterns on the skin layer.

* * * * *